(12) United States Patent
Trivedi et al.

(10) Patent No.: US 10,182,313 B2
(45) Date of Patent: *Jan. 15, 2019

(54) SYSTEM AND METHOD FOR PROVIDING A DIGITAL MEETING TOOL

(71) Applicant: Capital One Services, LLC, McLean, VA (US)

(72) Inventors: Dwij Trivedi, Oakton, VA (US); Gabe B. Gindele, Santa Clara, CA (US); Anant Sajnani, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/944,876

(22) Filed: Apr. 4, 2018

(65) Prior Publication Data

US 2018/0227701 A1 Aug. 9, 2018

Related U.S. Application Data

(63) Continuation of application No. 14/940,371, filed on Nov. 13, 2015, now Pat. No. 9,967,705.

(60) Provisional application No. 62/079,228, filed on Nov. 13, 2014.

(51) Int. Cl.
| | |
|---|---|
| *H04W 24/00* | (2009.01) |
| *H04W 4/021* | (2018.01) |
| *H04L 29/08* | (2006.01) |
| *H04W 4/12* | (2009.01) |
| *H04W 4/80* | (2018.01) |

(Continued)

(52) U.S. Cl.
CPC ............. *H04W 4/021* (2013.01); *H04L 67/26* (2013.01); *H04W 4/12* (2013.01); *H04W 4/80* (2018.02); *H04W 64/00* (2013.01); *H04W 76/40* (2018.02)

(58) Field of Classification Search
CPC .......... H04W 4/80; H04W 4/02; H04W 84/12
See application file for complete search history.

(56) References Cited

U.S. PATENT DOCUMENTS

| | | | |
|---|---|---|---|
| 8,538,458 B2* | 9/2013 | Haney | H04W 4/21 455/456.2 |
| 9,955,298 B1* | 4/2018 | Haney | H04W 4/022 |

(Continued)

*Primary Examiner* — Khalid Shaheed
(74) *Attorney, Agent, or Firm* — Troutman Sanders LLP; Christopher J. Forstner; John A. Morrissett

(57) ABSTRACT

Systems and methods include data storage that stores user information for a plurality of user devices, a beacon that is configured to be associated with a first unique identifier, a meeting server that receives, from the data storage, data that includes user information one of the user devices, assigns the first unique identifier to one of the user devices based in part on similarities between the user information and an entity associated with the beacon, and creates a digital asset that includes the first unique identifier and first information, and a communication interface associated with the meeting server that transmits, via a network, the digital asset to the one of the user devices. The beacon broadcasts the first unique identifier via a short-range transmission at a first location and the one of the user devices detects the first unique identifier at the first location, compares it to the identifier associated with the digital asset, and displays a notification that includes the first information if there is a match.

20 Claims, 6 Drawing Sheets

(51) Int. Cl.
*H04W 64/00* (2009.01)
*H04W 76/40* (2018.01)

(56) References Cited

U.S. PATENT DOCUMENTS

| | | | |
|---|---|---|---|
| 2008/0183804 A1* | 7/2008 | Hassett | G06Q 30/02 709/203 |
| 2011/0167125 A1* | 7/2011 | Achlioptas | G06F 17/30041 709/206 |
| 2012/0173373 A1* | 7/2012 | Soroca | G06F 17/30867 705/26.3 |
| 2014/0081694 A1 | 3/2014 | Grunberg et al. | |
| 2014/0108084 A1 | 4/2014 | Bargetzi et al. | |
| 2014/0282620 A1 | 9/2014 | Nuovo et al. | |
| 2015/0364017 A1* | 12/2015 | Hall | G06Q 10/06315 340/539.13 |
| 2016/0021687 A1 | 1/2016 | Granbery | |

* cited by examiner

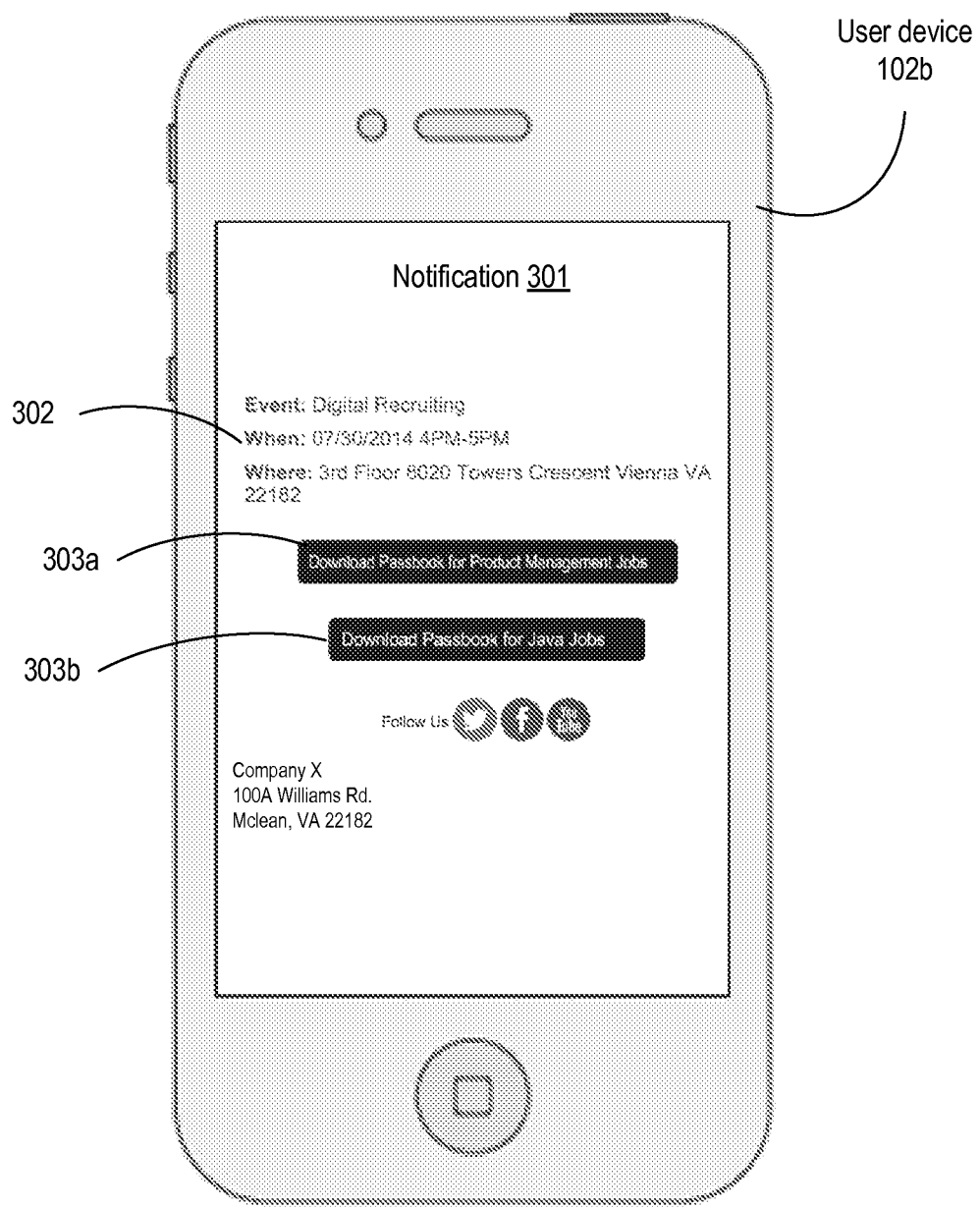

SYSTEM AND METHOD FOR PROVIDING A DIGITAL MEETING TOOL

CROSS-REFERENCE TO RELATED APPLICATIONS

This application contains subject matter related to and claims the benefit of U.S. Provisional Patent Application No. 62/079,228, filed on Nov. 13, 2014, the entire contents of which is incorporated herein by reference.

FIELD OF THE DISCLOSURE

The present disclosure relates to systems and methods for providing a digital meeting tool that alerts a user to the presence of a proximity sensor associated with another individual.

BACKGROUND OF THE DISCLOSURE

In crowded environments such as recruiting events, conferences, trade shows etc., it is difficult for a recruiter or other person to identify someone that is unknown or has an unfamiliar appearance. When a job applicant is attempting to meet the recruiter, there may be a lot of friction involved in figuring out the meeting place, timing, and location, and one or both parties may spend a significant amount of time approaching strangers as they search for one another. When creating recruiting events or similar meet-ups, there is a need to connect the right people at the event. There is also a need to tag, track and maintain the connection with passive candidates.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which:

FIGS. 3A-3C depict screenshots of a digital asset, according to an example embodiment of the disclosure.

DETAILED DESCRIPTION OF THE EMBODIMENTS

The following description is intended to convey a thorough understanding of the embodiments described by providing a number of specific exemplary embodiments and details involving systems and methods for providing a digital meeting tool to a user device. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A company and system supporting a company are used as examples for the disclosure. The disclosure is not intended to be limited to companies only.

In various embodiments, a user device receives a notification about an event, such as, for example, a recruiting event hosted by a company or a similar type meet-up, such as, for example, a trade show. The notification may contain a link to download a digital asset to the user device. For example, the notification may contain a link to add the digital asset to, for example, a Passbook of an iPhone user. The notification may contain a link to add the digital asset to a Google Wallet of an Android user. The digital asset may include identifiers associated with one or more recruiting devices. The digital asset may include a picture and contact information for the recruiter(s) associated with the one or more recruiting devices, and the address for the recruiting event. When the user device enters the location of the recruiting event and is in close vicinity, the recruiting devices at the event may be broadcasting their unique identifiers. When the user device detects an identifier that matches the identifier in the digital asset, the user device may generate a notification providing additional information about the recruiter, the job, the company, and other information related to the event. The notification may contain picture/title/bio of the hiring manager and links to various other relevant content such as list of positions, company profiles, company facilities, benefits etc. The notification may provide location information showing how close the user device is to the recruiting device.

Figure 1:
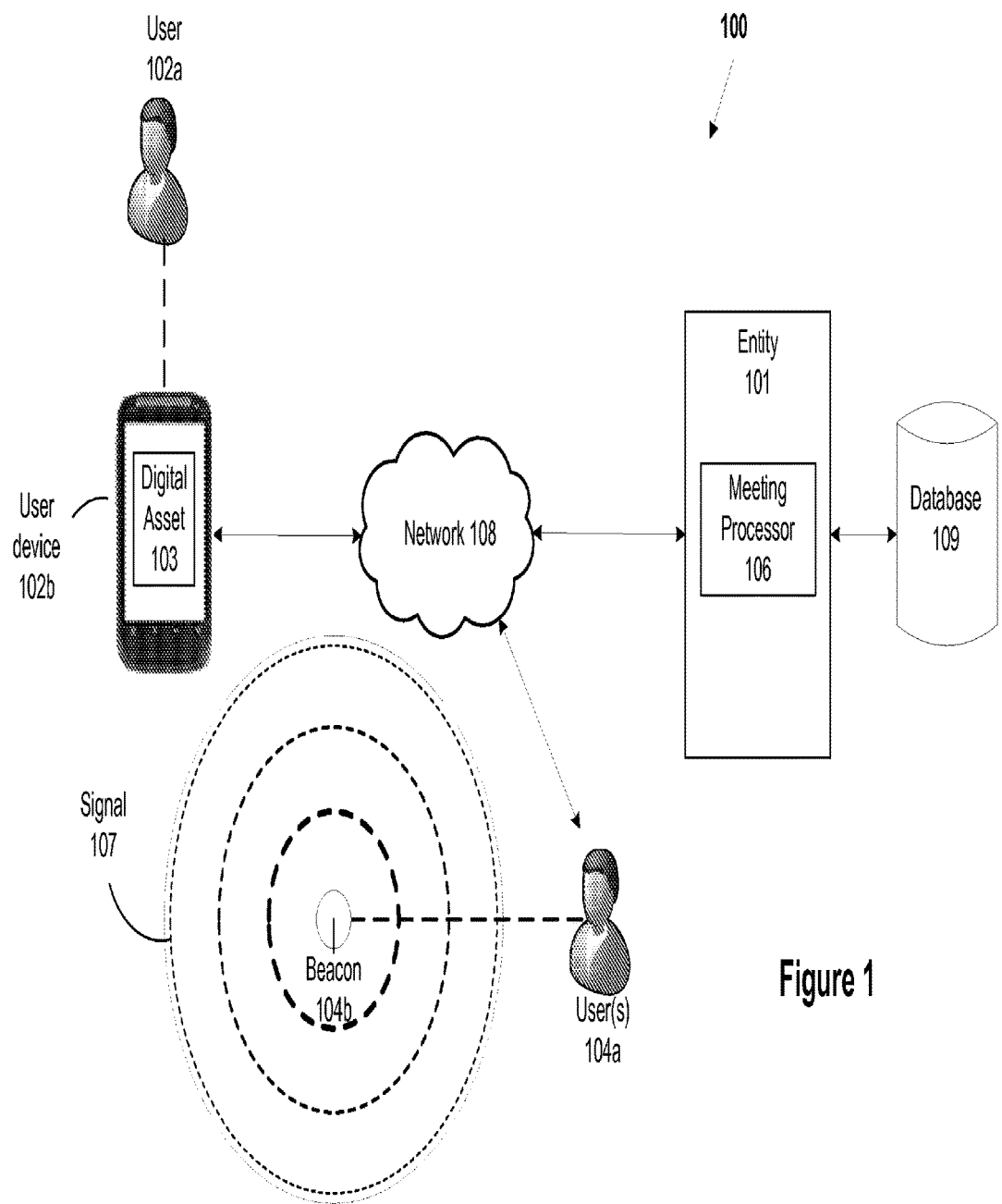
FIG. 1 depicts a schematic diagram of a system for providing a digital meeting tool to a user device, according to an example embodiment of the disclosure.

FIG. 1 depicts an exemplary embodiment of a system 100 for providing a digital meeting tool to a user device, according to various embodiments of the disclosure. The system 100 may include various network-enabled computer systems, including, as depicted in FIG. 1 for example, Entity 101 (comprising meeting processor 106), user device 102b, beacon 104b, database 109, and network 108. It is also noted that the system 100 illustrates only a single instance of each component. It will be appreciated that multiple instances of these components may be used. For example, various embodiments may include a plurality of user devices 102b, recruiter beacons 104b, databases 109, and/or meeting processors 106. Moreover, the system 100 may include other devices not depicted in FIG. 1.

In various example embodiments, meeting processor 106 may be a stand-alone component separate from Entity 101. Each processor may comprise one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications, such as meeting application 105, to enable a user of recruiter beacon 104 to transmit one or more signals to user device 102. In various embodiments, meeting application 105 may be integrated into a native mobile banking application and/or a mobile optimized web site associated with Entity 101, for example. The functionality of meeting application 105 also may be integrated into an online banking website.

The components depicted in FIG. 1 may store information in various electronic storage media, such as database 109. Electronic information, files, and documents may be stored in various ways, including, for example, a flat file, indexed file, hierarchical database, relational database, such as a database created and maintained with software from, for example, Oracle® Corporation, a Microsoft® SQL system, an Amazon cloud hosted database or any other queryable structured data storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal. Network 108 may comprise one or more secure communication channels for securely exchanging information between requestor device 102a, dispenser device 102b, and financial institution 101.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, user device 102b may be associated with user 102a. User 102a may be an individual or entity that desires to attend an event hosted by Entity 101. The event may be a networking event, job fair or job recruiting event, and user 102a may be a job applicant. Entity 101 may have one or more job openings that it posts on one or more web site and/or job boards. Entity 101 may be a company or institution, such as, for example, a bank, other type of financial institution, including a credit card and/or debit card provider, for example, or any other entity that offers accounts to customers.

User device 102b may be, for example, a handheld PC, a phone, a smartphone, a PDA, a tablet computer, or other device. User device 102b may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device (e.g., smart watch). Beacon 104b may be implemented in a device similar to user device 102b. In various embodiments, a device associated with beacon 104b may execute certain aspects of meeting application 105.

Meeting processor 106 may store a list of contact information for various individuals, including user 102a. The list may include email addresses, phone numbers, usernames on social media accounts, and other contact information associated with one or more individuals. In various embodiments, the individuals may be potential job applicants. The list may be created by meeting processor 106. The list may be provided to meeting processor 106 from another network-enabled computer (not shown). For each individual on the list, the list may include information related to the type of job or position that individual will be invited to apply for. User 102a may apply for a job by filling out an online application, and this information may be stored in the list by meeting processor 106.

Meeting processor 106 may create a digital asset for each individual on the list. The digital assets may be stored in database 109. Meeting processor 106 may create digital asset 103 for user 102a, based on the information provided by user 102a. Meeting processor 106 may assign one or more beacons to each digital asset in database 109. Meeting processor 106 may assign beacon 104b to digital asset 103. Beacon 104b may be a device that leverages Bluetooth Low Energy (BLE) to establish a region around the device by broadcasting signal 107 using one or more transceivers. The transceivers may use Bluetooth Low Energy (BLE) technology. The transceivers may include, for example, iBeacons. The transceivers may include RFID transmitters and receivers, cameras, scanners, and/or Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). Other exemplary NFC standards include those created by the NFC Forum. Beacon 104b may be hardware and/or software implemented on a device similar to user device 102b.

Beacon 104b may broadcast a unique identifier within an area around the beacon (shown as signal 107). The range of signal 107 may be limited, and the strength of signal 107 may decrease as it is transmitted out from beacon 104b. User device 102b may include one or more sensors for detecting signal 107. The sensors may be Bluetooth-enabled.

In various embodiments, beacon 104b may be associated with user 104a. User 104a may be a recruiter for Entity 101. Meeting processor 106 may assign beacon 104b to digital asset 103 based on similarities between user 102a and user 104a. For example, in various embodiments, user 102a may be a job applicant for a position with Entity 101 and user 104a may be a recruiter for Entity 101. Entity 101 may be hosting a recruiting event or job fair, and user 104a will be there with beacon 104b. Meeting processor 106 may create a digital asset 103 for user 102a that includes a description of the event, the date and time, a description of the job or jobs that the user 102a can apply for, a picture of user 104a, the unique identifier associated with beacon 104b, contact information for user 104a, and one or more links for websites associated with Entity 101. User 104a may be a recruiter for the specific type of job that user 102a has applied for.

User device 102b may receive digital asset 103 via network 108. Meeting processor 106 may send digital asset 103 in an email, text message, SMS, MMS, and/or via a messaging program associated with user 102a's social media account (or accounts). User device 102b may receive notification from meeting processor 106 that includes a link to download digital asset 103. For example, notification 301 is shown in FIG. 3A. Notification 301 may be an email, text message, MMS, or other electronic message. Notification 301 may include information 302 about the upcoming event (where user 102a will be attending). The information may include the name of the event, the date and time, and the location. Notification 301 may include links 303a and 303b for the user 102a to select and download a digital asset to user device 102b. Each link may be associated with a different digital asset (e.g., each digital asset may be associated with a unique job or unique recruiter). In various embodiments, digital asset 103 may be stored in, for example, a passbook. If the user selects links 303a and/or 303b, user device 102b may be connected to one or more websites where the user 102a can download digital asset 103 to user device 102b. In various embodiments, digital asset 103 may be part of a software application that user 102a may install on user device 102b.

Figure 3B:

FIG. 3B depicts a screenshot of an example embodiment of a digital asset 103 on user device 102b. The digital asset may be configured to work with, for example, Apple Passbook. The digital asset also may be configured to work with Google Wallet. The digital asset 103 shows the event information 304a (including the date and time of the event, the name of the event, the physical address, etc.). The digital asset 103 includes a picture 304b of the user 104a associated with beacon 104b. The digital asset 103 includes contact information 304c for the user 104a (e.g., name, job title, phone number). The digital asset 103 may include a bar code/QR code 305 that is linked to user 102a's email address.

Figure 3C:
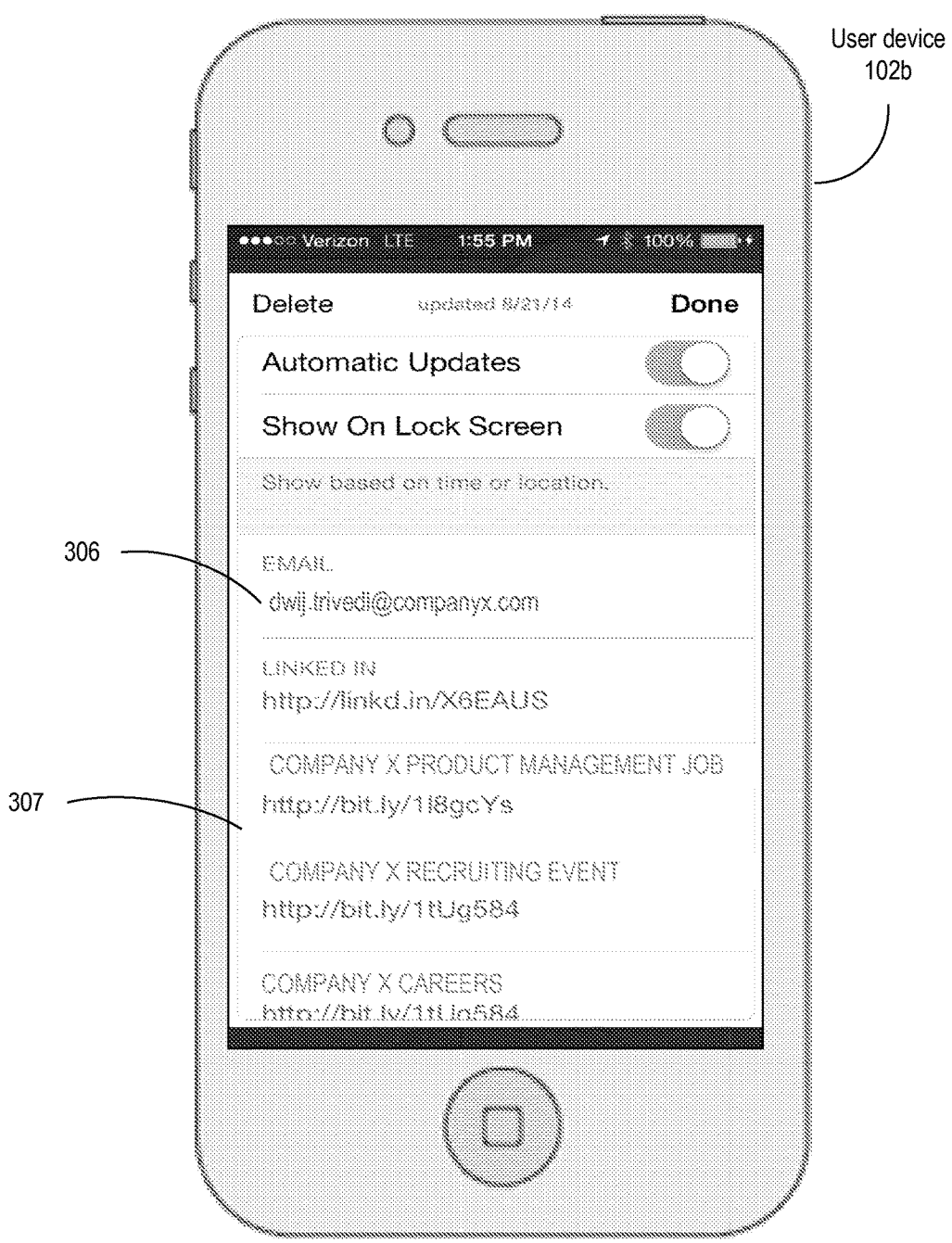

FIG. 3C depicts a screenshot of an example embodiment of a digital asset on user device 102b. This may be the same digital asset as the one shown in FIG. 3B. The digital asset may include contact information 306 for user 104a (e.g., an email address, a link to a LinkedIn profile, etc.). The digital asset may include job information 307, such as links to job postings, recruiting events, and other careers with Entity 101.

The user of user device 102b may be able to forward digital asset 103 to other user devices. The digital asset 103 may be sent as an attachment to an email, text message, SMS, MMS, in-app message, or electronic message on a social media platform. The user of user device 102b may forward the link in notification 301 to other user devices. In various embodiments, meeting processor 106 may update digital asset 103 and provided the updated digital asset to user device 102b. Meeting processor 106 may update the digital asset to reflect changes in the venue of the event, changes to the event description, changes to the recruiter 104a and/or recruiter device 104b, etc.

User 102a may bring user device 102b to the event described in the event information 304a shown in FIG. 3A. User 104a may be at the event with beacon 104b. Beacon 104b may be linked to another device used by user 104a, and user 104a may configure beacon 104b to transmit its unique identifier. Beacon 104b may itself be part of a device that is similar to user device 102b. In various embodiments, beacon 104b may automatically broadcast its unique identifier via signal 107. User device 102b may contain digital asset 103, which includes the unique identifier associated with beacon 104b. When user device 102b is at or nearby the same location as beacon 104b, user device 102b may detect signal 107 broadcast by beacon 104b. The signal 107 may include beacon 104b's unique identifier. User device 102b may compare the detected unique identifier with the unique identifier in digital asset 103.

If there is a match, user device 102b may display a notification for user 102a. The notification may include information from digital asset 103. The notification may show the picture 304b of user 104a. The notification may inform user 102a that user 104a is at the event. User device 102b may determine how close user device 102b is to beacon 104b, based on the strength of signal 107. The notification may display the location of user device 102b relative to beacon 104b. The notification may include contact information for user 104a (e.g., a contact number associated with beacon 104b). If there is no match, user device 102b may display a second notification to user 102a indicating that user 104a has not been detected at the event.

Figure 2:
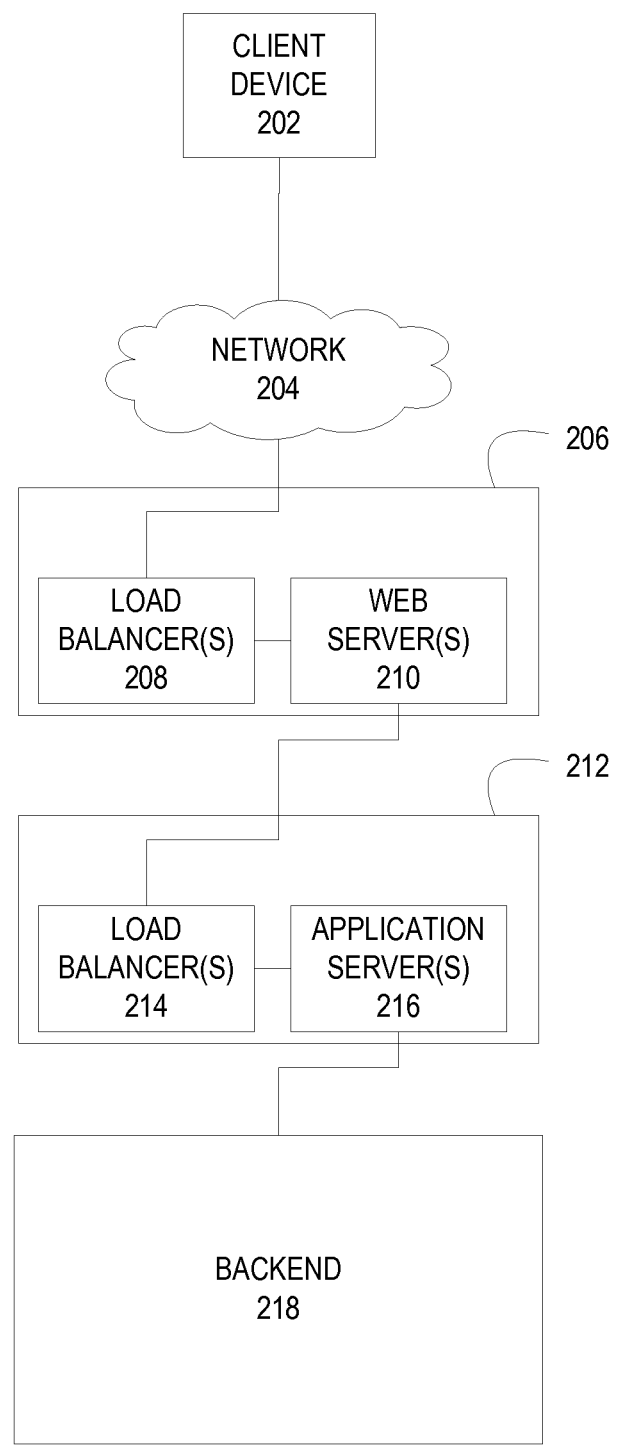
FIG. 2 depicts a schematic diagram of a system for providing a digital meeting tool to a user device, according to an example embodiment of the disclosure.

FIG. 2 depicts an example system 200 that provides providing a digital meeting tool to a user device. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. Client device 202 may be similar to user device 102b and/or user device that includes beacon 104b and executes a meeting application 105. Client device 202 may be configured to receive digital asset 103. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(S) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 and 214 may include software that monitoring the port where external clients, such as, for example, client device 202, connect to access various services of a financial institution or third party that provides the digital tool (such as system 100 shown in FIG. 1), for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200 and/or system 100, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200 and/or system 100. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, system 100 shown in FIG. 1, and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may be associated with one or more servers that enable the various services provided by system 100.

Figure 4:
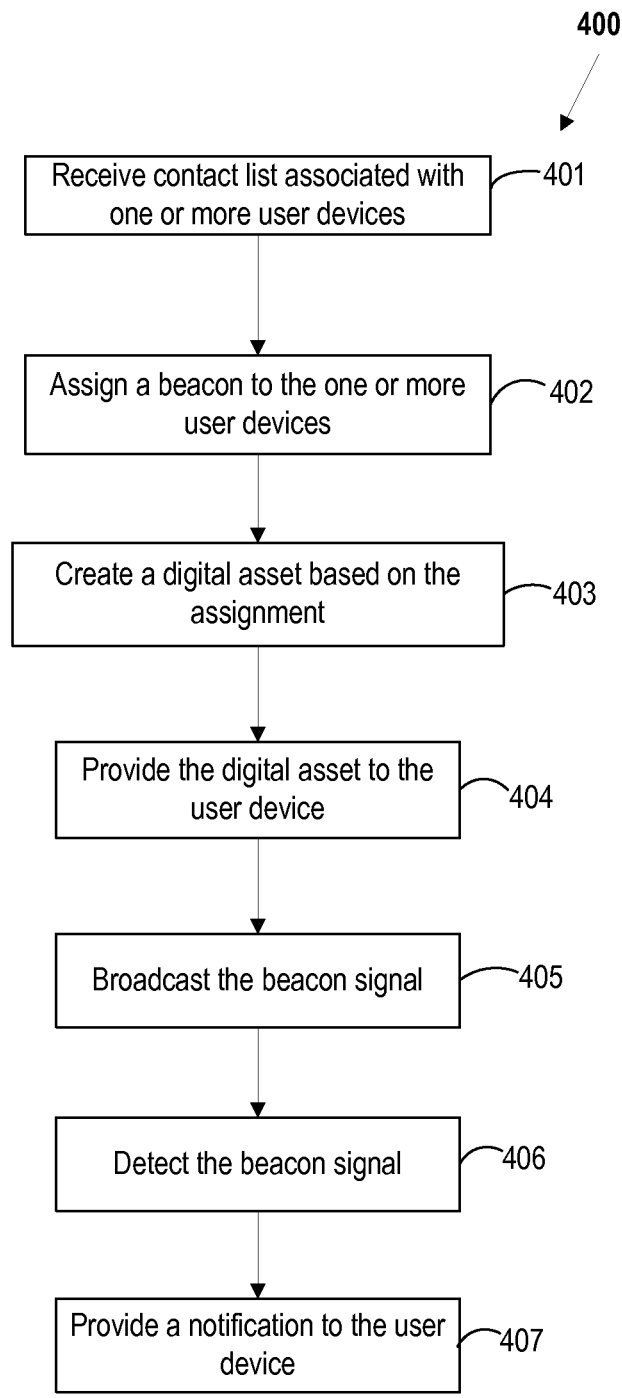
FIG. 4 depicts a schematic diagram of a method for providing a digital meeting tool to a user device, according to an example embodiment of the disclosure.

FIG. 4 is a flow chart illustrating an example method for providing a digital meeting tool to a user device. The method 400 shown in FIG. 4 can be executed or otherwise performed by one or more combinations of various systems. The method 400 as described below may be carried out by the system for providing a digital meeting tool, as shown in FIGS. 1, 2, 3*a*, and 3*b* by way of example, and various elements of that system are referenced in explaining the method of FIG. 4. Each block shown in FIG. 4 represents one or more processes, methods, or subroutines in the exemplary method 400. Referring to FIG. 4, the exemplary method 400 may begin at block 401.

At block 401, a contact list associated with one or more user devices may be received. Each of the user devices on the list may be associated with a user interested in attending an event. The event may be a job fair, for example, or any other like event where individuals may meet, such as, for example, a trade show. For example, in various embodiments, the event may be a dating event. The event may be a social event, such as a concert or a baseball game. Each user on the list may have previously expressed interest in attending the event. The contact list may include a contact number and/or email address associated with the user's device. In one example, the event may be a job fair, and each user on the list may be job candidates who are planning to attend the job fair. One candidate, John, may provide his email address and phone number associated with his smartphone to the entity hosting the event. John may have previously submitted this information in an online and/or paper application. The entity hosting the event—in this example, Company X—may receive a list of attendees (a contact list) that includes John's contact information.

At block 402, meeting processor 106 may associate each name on the contact list with a beacon or other transmitter, such as a BLE transmitter, NFC transmitter, RFID transmitter or the like. Each beacon may be implemented using a mobile device. For example, a representative affiliated with or associated with Company X that is recruiting individuals may configure a mobile device to act or serve as a beacon for the event. Each beacon may have a unique identifier that it can transmit using a short-range transmission method (e.g., Bluetooth, NFC, RFID, etc.). The beacon may be associated with an individual who will be attending the event and needs to meet with one or more of the users on the contact list. In this example, beacon A may be associated with a recruiter who works for Company X—Bob. Meeting processor 106 may create an entry in database 109 for John that includes his contact information, the information on the jobs he applied for, biographical information, and other relevant information. Meeting processor 106 may associate Bob's beacon (beacon A) with John's information in the database based at least in part on the fact that Bob is a recruiter for Company X, will be attending the job fair that John has applied to attend, and is associated with the specific types of jobs that John applied for and/or is interested in. A meeting application (e.g., meeting application 105) may be used to implement beacon 104*b*.

At block 403, meeting processor 106 may create a digital asset for a user (e.g., John) based on the information associated with the user (e.g., John) in database 109. In this example, the digital asset may be designed to work with, for example, Apple Passbook on John's smartphone. The digital asset may include beacon A's unique identifier. The digital asset may include information about the job fair (e.g., the location, date and time, directions, etc). The digital asset may include a picture of Bob. The digital asset may include one or more links to descriptions of different jobs offered by Company X that John may be qualified for.

At block 404, the digital asset may be provided to the user's device. In this example, John may receive a notification sent to his smartphone that includes the digital asset (e.g., as an attachment to an email or text message). The notification may include a link to one or more websites hosted by Company X where John can download the digital asset. John may download the digital asset to his smartphone and attend the job fair using the information provided in the digital asset. In various embodiments, John may download the digital asset using an application on his user device. Once the digital asset is on his phone, John may open the application and "add" the digital asset to his passbook (e.g., if his user device is an iPhone).

At block 405, the beacon may broadcast a signal that includes its unique identifier. In this example, Bob may be at the job fair with beacon A, and may use an application associated with beacon A to continuously broadcast beacon A's unique identifier using a short-range transmission method (e.g., Bluetooth, NFC, iBeacon technology, RFID).

At block 406, the user device may detect the signal from the beacon. In this example, John may be attending the job fair hosted by Company X. John's smartphone, which contains the digital asset, may detect the signal being broadcast by beacon A (associated with Bob). John's smartphone may be equipped with hardware and/or software to detect short-range transmissions (e.g., Bluetooth, NFC, iBeacon technology, RFID). Upon receiving the signal, John's smartphone may compare the unique identifier in the signal with the unique identifier associated with the digital asset on John's smartphone. If there is a match, the digital asset may provide a notification on John's smartphone (block 407). The notification may inform John that Bob is at the event. The notification may include Bob's picture. The notification may include Bob's contact information. The notification may show Bob's current location at the event. If John's smartphone detects one or more signals, but cannot determine a match, the digital asset may display one or more notifications informing John that Bob's beacon was not detected. The digital asset may provide a notification asking John to move closer to the event, or move into a different room (e.g., so that his device can better pickup beacon signals without interference).

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
   data storage configured to store user information corresponding to a plurality of user devices;
   a beacon configured to be associated with a first unique identifier;
   a meeting server configured to:
      receive, from the data storage, user information corresponding to at least one user device of the plurality of user devices,
      assign the first unique identifier to the at least one user device of the plurality of user devices based in part on similarities between the user information and an entity associated with the beacon, and
      create a digital asset that includes the first unique identifier and first information; and
   a communication interface associated with the meeting server, the communication interface being configured to transmit, via a network, the digital asset to the at least one user device of the plurality of user devices,
   wherein the beacon broadcasts the first unique identifier via a short-range transmission at a first location, and
   wherein the at least one user device of the plurality of user devices is configured to detect the first unique identifier at the first location, compare the first unique identifier to the identifier associated with the digital asset, and, when the first unique identifier matches the identifier associated with the digital asset, display a notification including the first information.

2. The system of claim 1, wherein the first information includes event information.

3. The system of claim 2, wherein the first information includes a photo of a user associated with the beacon.

4. The system of claim 3, wherein the first information includes contact information associated with the user of the beacon.

5. The system of claim 1, wherein the digital asset is maintained in a passbook of the one of the user devices.

6. The system of claim 1, wherein the communication interface is configured to transmit the digital asset to the at least one user device of the plurality of user devices via a short message service.

7. The system of claim 1, wherein the communication interface is configured to transmit the digital asset to the at least one user device of the plurality of user devices via a push notification.

8. The system of claim 1, wherein the communication interface is configured to transmit the digital asset to the at least one user device of the plurality of user devices via email.

9. The system of claim 1, wherein the at least one user device of the plurality of user devices is configured to determine the location of the at least one user device of the plurality of user devices relative to the beacon.

10. The system of claim 9, wherein a signal strength of the beacon is used to determine a proximity of the one of the user devices to the beacon.

11. A method comprising:
   maintaining a data storage configured to store user information corresponding to a plurality of user devices;
   receiving, at a meeting server and from the data storage, user information corresponding to at least one user device of the plurality of user devices;
   assigning, by the meeting server, a first unique identifier associated with a beacon to the at least one user device of the plurality of user devices based in part on similarities between the user information and an entity associated with the beacon,
   creating, by the meeting server, a digital asset that includes the first unique identifier and first information;
   transmitting, via a network using and via a communication interface associated with the meeting server, the digital asset to the at least one user device of the plurality of user devices; and
   broadcasting, by the beacon, the first unique identifier via a short-range transmission at a first location,
   wherein the at least one user device of the plurality of user devices is configured to detect the first unique identifier at the first location, compare the first unique identifier to the identifier associated with the digital asset, and, when the first unique identifier matches the identifier associated with the digital asset, display a notification including the first information.

12. The method of claim 11, wherein the first information includes event information.

13. The method of claim 12, wherein the first information includes a photo of a user associated with the beacon.

14. The method of claim 13, wherein the first information includes contact information associated with the user of the beacon.

15. The method of claim 11, wherein the digital asset is maintained in a passbook of the one of the user devices.

16. The method of claim 11, wherein transmitting the digital asset to the user device of the plurality of user devices comprises transmitting a message via short message service.

17. The method of claim 11, wherein transmitting the digital asset to the at least one user device of the plurality of user devices comprises transmitting, to the at least one user device of the plurality of user devices, instructions to initiate a push notification.

18. The method of claim 11, wherein transmitting the digital asset to the at least one user device of the plurality of user devices comprises transmitting an email message.

19. The method of claim 11, wherein the at least one user device of the plurality of user devices is configured to determine a location of the at least one user device of the plurality of user devices relative to the beacon.

20. The method of claim 19, wherein a signal strength of the beacon is used to determine a proximity of the one of the user devices to the beacon.

* * * * *